United States Patent Office 3,192,414
Patented June 29, 1965

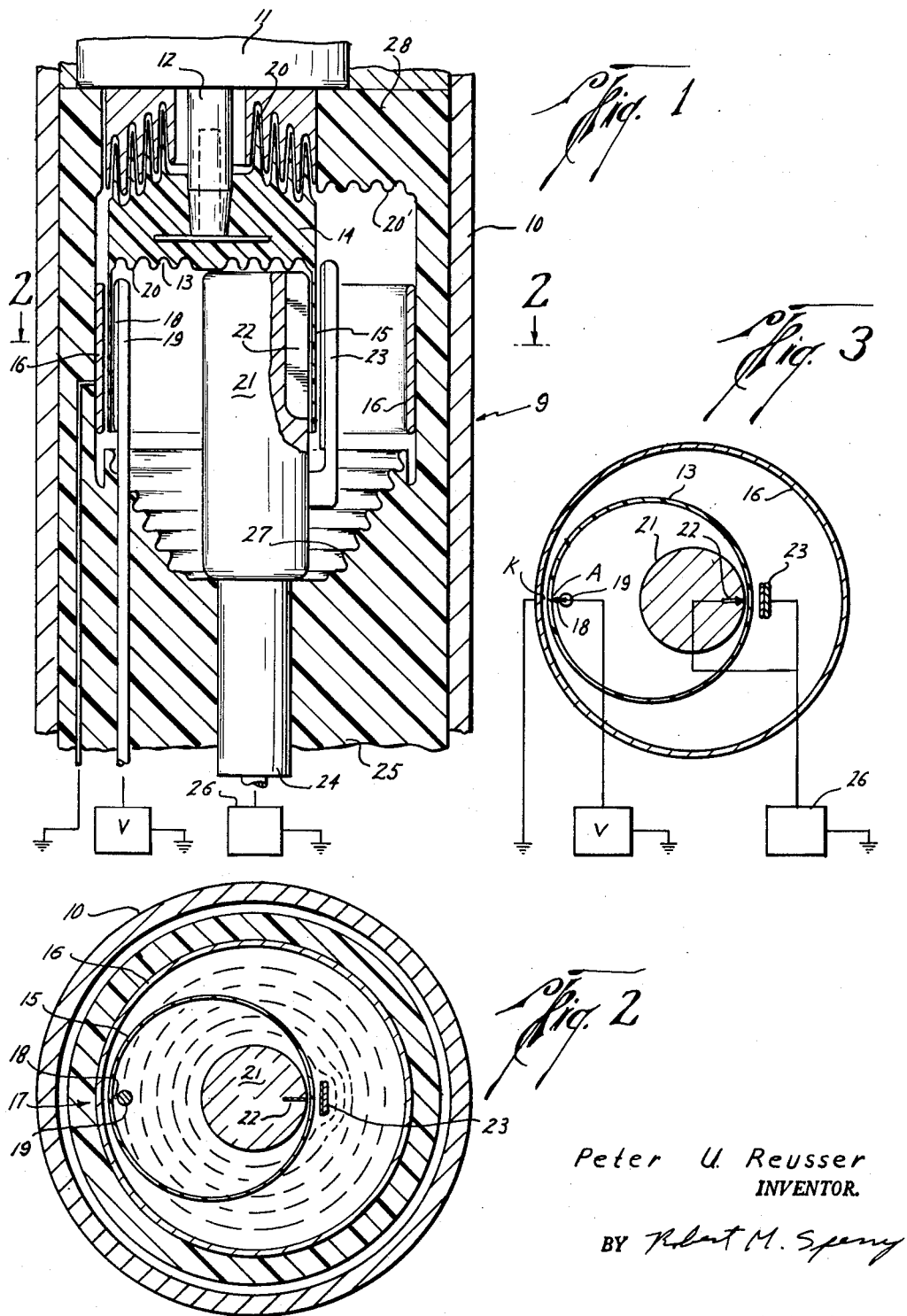

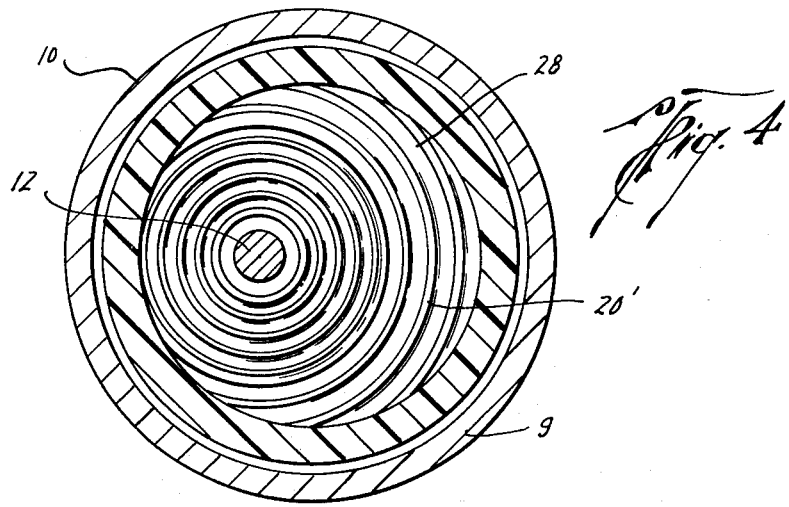
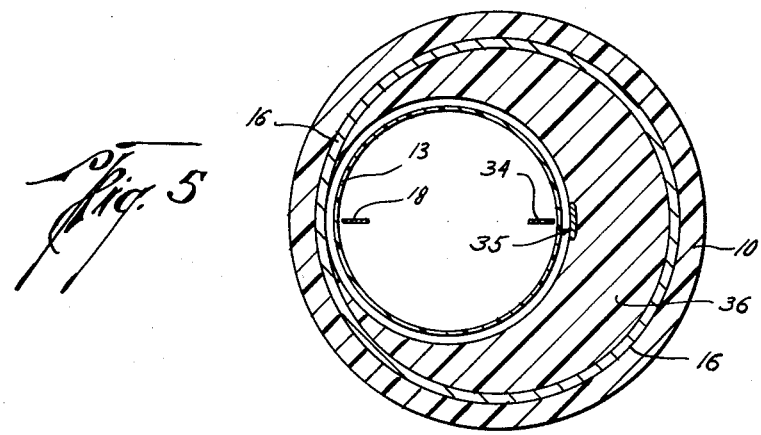
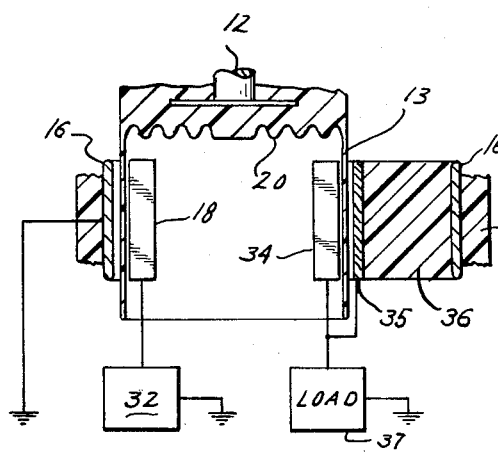

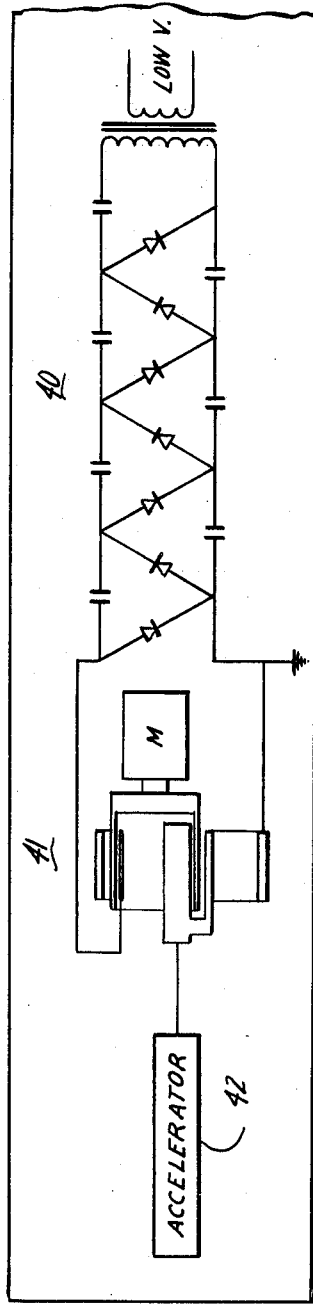
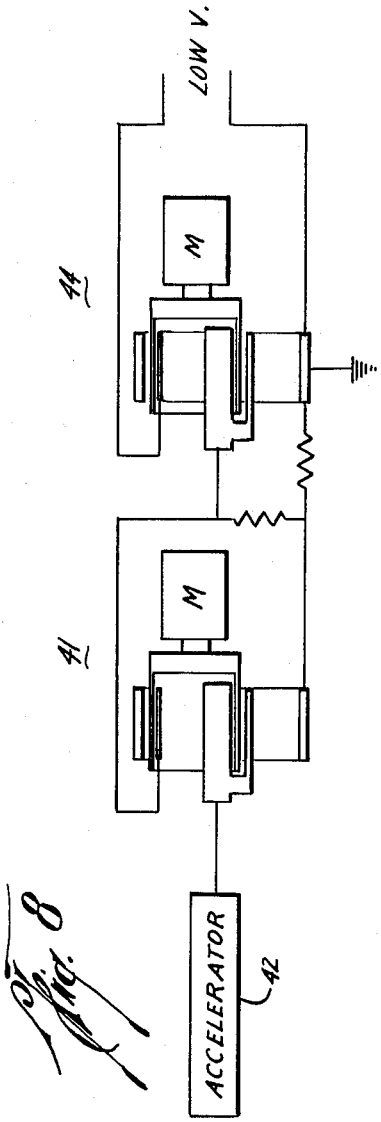
Peter U. Reusser
INVENTOR.

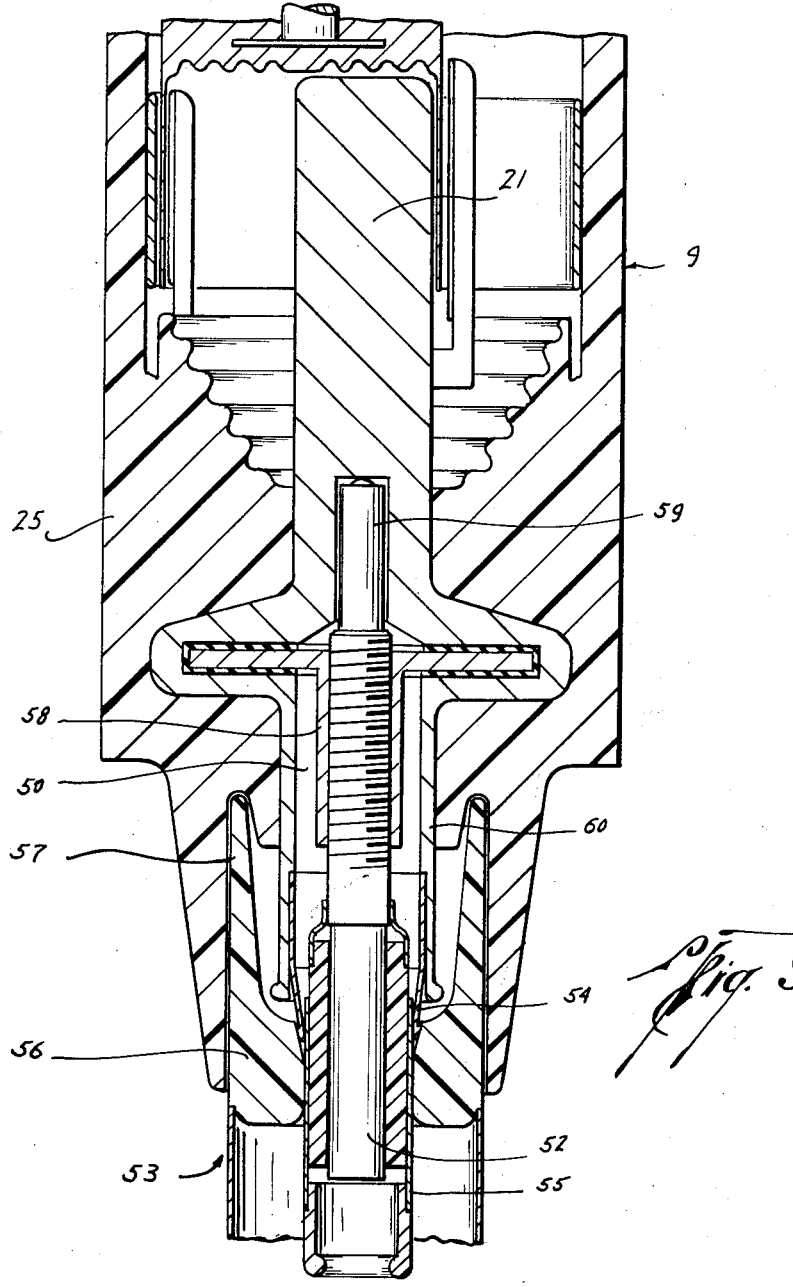

3,192,414
HIGH VOLTAGE, ELECTROSTATIC GENERATORS
Peter U. Reusser, Ridgefield, Conn., assignor to Schlumberger Well Surveying Corp., Houston, Tex., a corporation of Texas
Filed July 23, 1962, Ser. No. 211,811
13 Claims. (Cl. 310—6)

This invention relates to electrostatic generators and, more particularly, to electrostatic generators having an insulating rotor for transporting electric charges between electrodes to develop a high potential difference.

In contrast to Van de Graaff generators using an elongated charge-transporting belt, the rotor-type electrostatic generator inherently is of compact cylindrical configuration well suited, for example, to energizing a linear deuterium-tritium (D-T) accelerator employed in neutron well logging. The rotor may be composed of rigid insulating material free of wearing contact with the stator, electrodes, and the like for longer, higher speed operation than a belt.

In one rotor-type electrostatic generator previously proposed, an inductor is provided having a semi-conductive surface spaced closely about the rotor in an effort to linearize the electric field through which the charges are transported. In practice, however, non-uniformity and high-temperature instability of the semi-conductive surface lead to voltage breakdown and consequent permanent damage. Moreover, close spacing between the inductor and rotor reduces efficiency of the insulating gaseous atmosphere customarily employed and entails a more difficult manufacture with close tolerances. Current flow along the semi-conductive inductor additionally reduces operating efficiency.

Accordingly, an object of the present invention is to provide new and improved electrostatic generators in which charge particles are rotated between electrodes to develop a high potential difference effectively under a wide variety of conditions.

It is a further object of the present invention to provide electrostatic generators affording a relatively high voltage and power output while requiring only a limited space and power input.

It is a still further object of the present invention to provide high voltage electrostatic generators free of any semiconductor along the path of charge transport and employing a dielectric charge carrier which is substantially undamaged by voltage breakdown.

It is another object of the present invention to provide electrostatic generators which can be operated in high ambient temperatures with substantially no adverse effect upon voltage or current output.

It is still another object of the present invention to provide electrostatic generators having a highly uniform voltage gradient along the path of charge transport to preclude voltage breakdown with high output potentials.

It is yet another object of the present invention to provide such electrostatic generators which are readily manufactured and assembled for long and reliable operation.

These and other objects are attained, in accordance with the invention, by eccentrically mounting a tubular dielectric rotor, constituting the charge carrier of an electrostatic generator, between coaxial cylindrical electrodes. Provision is made for removing charges from the rotor to the inner electrode to establish a high potential difference with respect to the outer electrode. However, by suitably proportioning the radii of the electrodes, the voltage gradient resulting from such potential difference may be highly uniform, correspondingly to minimize the likelihood of voltage breakdown. To avoid wearing contact, knife edges or the like may be employed for spraying on and inducing removal of charges near generatrices of the rotor diametrically opposed in the plane of its eccentricity with respect to the electrodes.

Conveniently, the outer electrode is grounded and output current at a high voltage is derived from the inner electrode. In one embodiment of the invention, the outer electrode is of annular form received within a tubular dielectric housing. In another embodiment, a metallic housing forms the outer electrode.

The invention may be more readily understood from the following detailed description taken with reference to the accompanying drawings, in which:

FIG. 1 is a cut-away side view of an electrostatic generator embodying the principles of the present invention;

FIG. 2 is a sectional view of the generator shown in FIG. 1 taken along the line 2—2 with the idealized equipotential lines shown in light lines;

FIG. 3 is a schematic representation of electrical circuitry associated with the electrostatic generator of FIGS. 1 and 2;

FIG. 4 is an axial view showing the corrugations in the upper interior of the housing of FIGS. 1 and 2 about the rotor;

FIG. 5 is a sectional view, similar to that of FIG. 2, showing an alternative form of the generator of FIGS. 1-4;

FIG. 6 is a cut-away side view of the generator of FIG. 5;

FIG. 7 is a diagrammatic representation of the generator arranged in junction with a linear D-T accelerator for neutron well logging;

FIG. 8 is a diagrammatic representation like FIG. 7, but utilizing cascaded generators; and FIG. 9 is a cut-away side view of a modified form of the generator of FIG. 1 which is particularly useful in connection with borehole accelerators.

In FIG. 1 is shown an electrostatic generator 9 which, in accordance with the invention, produces a high voltage output by transporting charges through a smoothly increasing electric field. A pressure housing 10 supports a motor 11 and is made from a material which is strong and resistant to heat if the unit is to be used in high temperatures. Supported by housing 10 are an insulating body 25 and cap 28 both made from a good insulating material. I have found that approximately one-third mica mixed with two-thirds epoxy resin and molded or machined in a standard fashion is a good material for use at lower temperatures. Ceramic materials can be used with good results for higher temperatures. At the various joints and places where the connections to the electrodes and motor 11 extend through housing 10, suitable gaskets and seals (not shown) should be used to assure the housing 10 being pressure tight at the elevated gas pressures which it is desirable to use within the housing 10. Motor 11 is preferably sealed within housing 10 since it is difficult to obtain a suitable high pressure rotary seal between the motor 11 and the gas under high pressure in the generator.

Shaft 12 supports and imparts a rotary motion to rotor 13 made from any suitable insulating material. I have found that the mica impregnated epoxy resin mentioned above will give very satisfactory results and is not given to material deformation at the high speed at which it is desirable to operate. For operation at elevated temperatures, an insulating ceramic or other insulating material which is not subject to deformation at the operating temperature and forces is desirable. The end 14 of the rotor 13 is primarily a support between the charge carrying, rotating drum portion 15 of the rotor and the rotating shaft 12. Since there will be a substantial voltage differential between various parts of this support, it is constructed in accordance with conventional high voltage practice whereby corrugated concentric waves 20 increase the path length over which leakage charges will have to move, as seen in FIGS. 1 and 4. Similar waves 20' are, preferably, formed on the insulating cap 28. Note that, in FIG. 4, the waves 20' of the insulating cap 28 are preferably formed concentric with respect to shaft 12 of rotor 13. Since, ideally, the current output will vary directly as the length of the drum portion 15, provided the operating conditions remain the same and the other cooperating elements are equally increased or decreased in length, the charge carrying drum portion 15 of the rotor 13 should be at least long enough to carry the output that is required from this generator.

Excitation inductor 16 is a metallic conducting cylinder which is roughly the same length as the charge carrying portion 15 of the rotor 13 and which is connected electrically to a source of ground potential. As best seen in FIG. 2, it is positioned so that its axis is parallel to the axis of the rotor 13 but offset with respect thereto. Hence, excitation inductor 16 and charge carrying drum 15 of the rotor 13 are in proximity at one place at the low voltage excitation point 17. An excitation knife edge 18 is mounted at the place 17 where there is the least clearance. The knife edge 18 is preferably somewhat shorter than the excitation inductor 16 so as to avoid the area of field distortion adjacent the ends of inductor 16, and will be normal to the interior surface of the charge carrying drum 15 with its long axis parallel to the axis of the rotor 13. The clearance between knife edge 18 and charge carrying drum 15 should be approximately .010 inch. Excitation knife edge 18 may conveniently be made of a thin blade of metal having a straight, smooth edge of approximately .002 inch radius, and can be mounted in a metallic conductor and support 19.

An excitation voltage, from a suitable source V sufficient to cause charged particles to flow from the knife edge 18 to the charge carrying drum 15, is connected between conductor support 19 and inductor 16. These charged particles travel towards the excitation inductor 16, but are prevented from completing this trip by the insulated, moving, charge carrying drum 15. Since the charge carrying drum 15 is made from an insulating material, the charged particles will remain on the surface thereof at the place where their free movement was stopped. A convenient excitation voltage has been found to be approximately 20–30 kilovolts for hydrogen under pressure of 260 pounds per square inch with a total excitation gap of .06 inch. It has also been found that, if the clearance between the excitation inductor 16 and the charge carrying drum 15 is roughly twice the clearance between the knife edge 18 and the charge carrying drum 15 when the rotor is not in rotation, good results can be obtained with a minimum of breakdowns.

High voltage electrode 21 is a cylindrical, polished conductor which should have rounded edges and is placed concentrically within the inductor ring 16. The ratio of diameter of the high voltage electrode 21 to the inside diameter of the inductor ring 16 should for maximum output be approximately equal to $1/E$, where E is 2.718, the base of the natural logarithmic system. As seen in FIGS. 1, 2, and 3, the diameter of inductor ring 16 is about 2.7 times the diameter of the high voltage electrode 21. It is found that this ratio of the diameters produces minimum field intensity at the surface of high voltage electrode 21 and provides minimum variations in the tangential field along drum 15. Mounted in the high voltage electrode 21 on the portion furthest from the knife edge 18, but in the same manner, is another knife edge 22 which projects slightly from the surface of the high voltage electrode 21 toward drum 15. Connected to the high voltage electrode 21 is an inductor 23 which in its transverse section may be rounded to substantially conform to the circumference of drum 15 or flat, as shown in FIG. 2, and which is supported on and electrically connected to high voltage electrode 21, but is positioned adjacent drum 15 outside of the charge carrying drum 15 as seen in FIGS. 1, 2, and 3. Thus, charge carrying drum 15 is free to rotate between inductor 23 and knife edge 22. This high voltage inductor 23, since it is connected to high voltage electrode 21, serves as a Faraday cage and will create a field-free space in the region between the knife edge 22 and the inductor 23. However, as charges are carried into this Faraday cage on the charge carrying drum 15 they will induce charges on the high voltage electrode 21 so that an electric field will be established between high voltage electrode 21 and drum 15. This field will be maximum at knife edge 21 causing a breakdown whereby drum 15 will discharge the charged particles it is carrying to the knife edge 22. The charges can then be utilized in a load 26 connected between ground potential and high voltage conductor 24 which is connected to high voltage electrode 21.

The charges collected by electrode 21 will raise the potential of this electrode and thus establish an electric field between inductor electrode 16 and high voltage electrode 21. This field will continue to increase until load 26, connected between ground and high voltage connection 24, has a sufficient voltage across it to conduct all of the charges being supplied to the knife edge 22. When the machine is first started, the field between high voltage electrode 21 and the inductor ring 16 will be zero. As the field develops, the charged particles will be carried from a low potential point in the field, adjacent inductor ring 16, to a point of an increasingly high potential in the field adjacent knife edge 22 by the charge carrying drum 15. Thus, the work being done on the charged particles keeps increasing with time giving them an increasing amount of energy to expend in load 26. The field will continue to increase until it is sufficient to force all the charges supplied to knife edge 22 through the load 26.

It is also seen that because of the concentric configuration of the ground inductor 16 and the high voltage electrode 21, there will be a very uniform field through which the charges will be moved; hence, there will be no tendency for breakdown caused by sudden variations in the field.

The insulating material within housing 10 should be designed in accordance with high voltage engineering practice to reduce as much as possible sparking, unwanted corona discharge and current leakage. For instance, body 25 and cap 28 should have arcuate, concentric corrugations 20' and 27 at each end. At the motor end 28, corrugations 20' are preferably concentric with the shaft 12 while, at the other end 25, corrugations 27 are concentric with electrode 21 and extend to the wall of the housing 10. These corrugations lengthen the paths over which leakage charges have to flow and, hence, reduce the leakage current. All metal parts should be polished and all parts except the knife edges should have rounded corners and edges.

The housing 10 is preferably filled with a suitable insulating material, such as hydrogen gas under fairly high pressure. The pressure will be determined by the characteristics of the generator and the voltage which is required However, with an increase in pressure, it is also necessary to increase the excitation voltage supplied to knife edge 19 accordingly. As an example of the voltage and pressures for a generator with a rotor of approximately two inches diameter, an output of 160 kilovolts has been obtained with a pressure of 260 pounds per square inch of hydrogen with an excitation voltage of 25 kilovolts. Other insulating gases can be used such as nitrogen, some of the freons, hydrogen, helium, and various combinations of these. The potential at which breakdown occurs increases approximately linearly with the gas pressure. It will be understood, however, that other insulating materials, such as a good vacuum, may be used, if desired. The use of gas as an insulating material makes this device quite insensitive to temperature changes since, as the temperature increases, the pressure increases thereby offsetting the decrease in the breakdown point of the gas caused by the increased temperature.

It will be understood that with a larger diameter rotor, higher voltages can be obtained. For instance, if the outside diameter of the machine were made to be approximately twelve inches, it would be possible to obtain at least 500 kilovolts output. Further increases in size would result in even higher voltages.

There are three types of short circuits which may occur in a generator of this nature. First, there is an external short, such as is caused by a malfunctioning load, which does no harm to the generator because the central electrode loses its potential and thus, no appreciable voltage can be generated.

The second type of short is an internal short through the gas. This should be avoided if possible; however, as pointed out above, if it does occur, it is self-healing and, therefore, will not damage the generator.

The third type of short which may occur is an internal short through the solid dielectric materials, such as insulating body 25.

Internal shorts, through the solid dielectric material, damage the generator and should be avoided.

The efficiency of this generator is very high since there are no brushes, resistor chains nor semi-conductive coatings as called for by the prior art. All of these, which require power, have been eliminated.

FIGS. 5 and 6 disclose another embodiment of my invention which will serve more fully to illustrate the basic principles of operation. The same insulating housing 10, inductor 16, charge carrying drum 13, excitation knife edge 18, and support 19 are used. The high voltage electrode 21 of FIG. 1 is greatly reduced in size and high voltage knife edge 34 is supported thereby. High voltage inductor 35 has a modified mounting, but is generally of the same configuration as high voltage inductor 23 in FIG. 1. The space surrounding the charge carrying drum 13 contains a solid insulation 36 which supports inductor 35. Consequently, at the point of the highest field gradient between inductor 35 and inductor 16, a very effective insulation can be placed, thereby, increasing the high voltage breakdown point of this generator. Similar insulation can be placed in the same position in the generator shown in FIG. 1 and it will there decrease the possibility of high voltage breakdown just as here. However, due to the very even field gradient in FIG. 1, this will not ordinarily be necessary.

The operation of this device is best described in terms of a varying capacitance type of high voltage generator. The charges are sprayed from knife edge 18 onto the charge carrying drum 13 by means of an excitation circuit 32 connected to the knife edge 18. As in FIG. 1, inductor 16 is connected to ground potential. The rotor drum 13 rotates past the knife edge 34 and the inductor 35. It will be seen that the capacitance at the point where the charges are placed on the rotor 13 will be relatively high between the inductor 16 and the inside wall of the rotor 13. However, as the rotor 13 is rotated, the inductor 16 gets further and further away from the point where the charges were sprayed on the rotor, hence, effectively decreasing the capacitance between the rotor 13 and the inductor 16. Since the charge remains the same and since the capacity is decreasing, it follows that the voltage between the inductor 16 and the charged particles have reached knife edge 34 and the inductor 16 which is at ground potential, and any suitable load 37 can be connected between these as shown in FIG. 6.

Suitable techniques as described in conjunction with the first embodiment of FIGS. 1–4 should be employed to lengthen the leakage current path lengths between points of high and low potential, to fill the housing 10 with a suitable insulating material, such as gas under high pressure and to round all exposed metal surfaces except for the knife edges to reduce chances of voltage breakdown. The rotor 13 should be thick enough to prevent breakdown, but thin enough to provide as high an initial capacity as possible. Rotor thickness of about .040 inch have been found to be satisfactory. The excitation voltage required for this generator will be approximately the same as that required for my first embodiment. The thickness of the rotor 13 should be governed by the excitation voltage to be used. As the thickness of the rotor 13 is decreased, the excitation voltage required is lowered.

Generators embodying the principles disclosed in the above discussion of two specific embodiments are ideally suited for any application where high voltage and relatively high current must be generated within a limited space.

Moreover, because of the high power-to-weight ratio of the electrostatic generators of the present invention, they will find many applications in the high voltage field which are now not feasible because of the relatively large cost and weight per unit of voltage and power of the available electrostatic generators. For instance, large generators embodying the present invention may be used to power large particle accelerators and also to provide high voltage direct current for the efficient transmission of electrical power since these units can also function as a motor to convert the high voltage direct current to mechanical power. Much smaller units, on the order of two to three inches in diameter, can be used to furnish high voltage power for use in conjunction with various well logging tools. Specifically, the high voltage generators of the present invention can be used to furnish the high voltages required by borehole accelerators as noted above, and to furnish the high voltage, high power requirements of sonic power producers. Both the accelerator and the sonic power producers furnish useful information concerning the formations surrounding a borehole when used in conjunction with suitable detectors.

One example of such a use is in power supply for an accelerator tube to be used in a borehole as disclosed in the copending application of Clark Goodman, Serial No. 275,932, filed March 1, 1952, entitled "Neutron Well Logging" and assigned to the present assignee. The electrostatic generators of the present invention are particularly well suited for supplying the high voltage required for this type of device since, in the event of a short in the accelerator tube, the high internal impedance of the generator prevents any severe harm from occurring to the accelerator tube. Moreover, the current flow will be limited to the number of charged particles the rotor 13 is carrying. Even smaller units can be utilized to furnish the high voltage necessary for various electronic devices, such as cathode ray tubes and infrared detectors.

The excitation voltage can readily be obtained from any suitable source of voltage capable of supplying between approximately 10 to 40 kilovolts. For instance, FIG. 7 shows a Cockcroft-Walton voltage multiplier 40 connected as the excitation source to a rotary, high voltage generator 41, such as those of FIGS. 1 or 6, whose output is in turn connected to an accelerator 42; for example, the accelerator of the aforementioned Goodman application, arranged within a pressure resistant housing 43. The specific circuitry of the Cockcroft-Walton generator 40 is well known to those skilled in the art and was described by Cockcroft-Walton in the "Preceedings of the Royal Society" volume 129, page 477 (1930); volume 136, page 619 (1932).

Combining the Cockcroft-Walton generator with the high voltage, electrostatic generator offers the advantage that the excitation voltage and, hence, the voltage output from the electrostatic generator can be varied by varying the supply voltage to the primary winding of the transformer which excites the Cockcroft-Walton generator.

The number of charges being sprayed on the rotor 13 can also be varied by using a constant excitation voltage in conjunction with a current regulating source.

If pulsed operation of the accelerator 42 is desired, it can be readily obtained with a minimum of capacitative loss by placing two of my generators in cascade and pulsing the excitation voltage of the low voltage generator 44 as shown in FIG. 8. The same arrangement could be used for straight direct current operation by exciting the low voltage generator 44 with a low voltage direct current. The low voltage generator 44 will have the insulating gas at lower pressures to enable it to operate on a lower exciting voltage.

It will be apparent to those skilled in the art that simply by reversing the connections to the knife edges and the inductors, the center electrode would become the low voltage electrode and the charges would be carried from there to the high voltage, outer electrode. The excitation voltage would then be used in conjunction with the center electrode and its associated knife edge. This arrangement requires that there be a considerable amount of insulation around the high voltage, external electrode.

An embodiment, particularly adapted for use in the small confines of the borehole is disclosed in FIG. 9 in which the electrostatic generator, hereinbefore described, is connected to the accelerator tube (more fully discussed in U.S. Patent No. 2,923,820, issued May 9, 1961 to Arthur H. Frentrop and assigned to the present assignee) in which the high voltage, central electrode 21 is continued past the insulation 25 at the bottom of the high voltage, electrostatic generator of the present invention and is hollowed out, as seen at 50 in FIG. 9, so that it can extend over the target electrode 52 in the accelerator tube 53. Mounted on the hollowed out end of high voltage electrode 21 is an annular contacting ring 54 which is adapted to press against the suppressor electrode 55 of the accelerator tube 53 when the accelerator tube 53 and the high voltage, electrostatic generator 9 are assembled. The corrugated insulation 56 on the accelerator tube 53 is designed to mesh with the insulation 25 on the electrostatic generator 9, as seen at 57, so that long paths must be traveled for any charges to reach the ground potential. Supported within, but insulated from the hollowed portion of high voltage electrode 21, is a tubular member 58 adapted to encircle and connect with target 52 when the accelerator tube 53 and the high voltage, electrostatic generator 9 are connected together. A high resistance 59 is connected between cylinder 58 and the high voltage electrode 21, whereby the target 52 may be maintained at a slightly lower potential than the suppressor electrode 55.

This construction allows separate manufacture and replacement of the accelerator tube 53 and the high voltage, electrostatic generator 9. If, however, it is desired to further shorten the whole unit, then it will be apparent that the insulators 25 and 56 can be made integral with each other and that the suppressor electrode 55 can be made integral with the high voltage electrode 21. The target electrode 52 and resistor 59 are then supported within said hollowed out high voltage-target electrode. It will be readily apparent that this arrangement eliminates the need for complicated high voltage connectors and insulators and that the units described herein can be readily constructed with a minimum of effort and that this invention will enable a very small combination of high voltage supply and accelerator target. Further, the geometry of the high voltage electrodes is very excellent since the high voltage is, in reality, utilized on the same electrode where it is produced with the major portion of the electrode surrounded by continuous insulation.

While the term "knife edges" has been used in this specification, it will be understood by those skilled in the art that a series of needle points, or a fine wire, or any electrode having a sharp termination cna be substituted therefor.

While I have described two embodiments of my rotary, high voltage, electrostatic generator, various modifications will be apparent to those skilled in the art. Hence, my invention should not be limited to the embodiments disclosed, but is of a scope defined by the following claims.

I claim:

1. A high voltage electrostatic generator comprising a rotor formed of dielectric material; an annular electrode; a generally cylindrical high voltage electrode mounted concentrically within said annular electrode, said high voltage electrode being sized to promote a uniform electric field within the annulus defined between said electrodes; means mounting said rotor eccentrically within said annulus, means for applying charged particles to said rotor adjacent one of said electrodes; and means for removing charged particles from said rotor adjacent the other of said electrodes.

2. A high voltage electrostatic generator comprising a cylindrical housing composed of insulating material hollowed to define a chamber having end walls with concentric corrugations to provide an extended electrical leakage path; an annular electrode mounted on the cylindrical sidewall of said chamber and having electrical connections extending outside said chamber; a thin-walled cylindrical rotor formed of dielectric material rotatable within said annular electrode; shaft means extending axially through one end wall of said chamber to support said rotor eccentrically with respect to said annular electrode; first charge transfer means for applying charged particles to said rotor and having electrical connections extending outside said chamber; second charge transfer means for removing charged particles from said rotor and having electrical connection extending outside said chamber; and a high voltage electrode extending through the other end wall of said chamber centrally within said annular electrode and eccentrically within said rotor adjacent one of said charge transfer means and diametrically opposite the other of said charge transfer means and sized to promote a uniform electric field in the vicinity of said rotor.

3. A high voltage electrostatic generator comprising an annular electrode, a dielectric cylinder rotatable about the axis thereof within the annulus defined by said electrode, means mounting said cylinder eccentrically with respect to said annular electrode, a high voltage electrode of generally cylindrical configuration centered within said annular electrode and sized to promote a uniform electric field in the vicinity of said dielectric cylinder, first charge transfer means located adjacent the position where said cylinder passes closest to said annular electrode and cooperating with said annular electrode to transfer charged particles between said cylinder and said first charge transfer means, and second charge transfer means located adjacent said cylinder and substantially diametrically opposite from said position for transferring charged particles between said cylinder and said high voltage electrode.

4. A high voltage electrostatic generator comprising an annular electrode, a dielectric cylinder rotatable about the axis thereof within the annulus defined by said electrode, the inside diameter of said electrode being substantially greater than the outside diameter of said cylinder, means mounting said cylinder eccentrically with respect to said annular electrode, a high voltage electrode of generally cylindrical configuration centered within said annular electrode and sized to promote a uniform electric field in the vicinity of said dielectric cylinder, first charge transfer means located adjacent the position where said cylinder passes closest to said annular electrode and cooperating with said annular electrode to transfer charged particles between said cylinder and said first charge transfer means, and second charge transfer means located adjacent said cylinder and substantially diametrically opposite from said position for transferring charged particles between said cylinder and said high voltage electrode.

5. A high voltage electrostatic generator comprising an annular electrode, a hollow dielectric cylinder rotatable about the axis thereof within the annulus defined by said annular electrode, means mounting said cylinder eccentrically with respect to said annular electrode, the inside diameter of said annulus electrode being substantially larger than the outside diameter of said cylinder, charge transfer means located inside the path of rotation of said cylinder adjacent the position where said cylinder passes closest to said annular electrode and cooperating with said annular electrode to transfer charged particles between said cylinder and said charge transfer means, a cylindrical electrode coaxial with said annular electrode located inside the path of rotation of said cylinder and means having a sharp termination supported by said cylindrical electrode to promote the transfer of charged particles between said cylinder and said cylindrical electrode.

6. A high voltage electrostatic generator comprising an annular electrode, a hollow dielectric cylinder rotatable about the axis thereof within the annulus defined by said annular electrode, means mounting said cylinder eccentrically with respect to said annular electrode, the inside diameter of said annular electrode being substantially larger than the outside diameter of said cylinder, charge transfer means located inside the path of rotation of said cylinder adjacent the position where said cylinder passes closest to said annular electrode and cooperating with said annular electrode to transfer charged particles between said cylinder and said charge transfer means, a cylindrical electrode coaxial with said annular electrode and located inside the path of rotation of said cylinder and means having a sharp termination supported by said cylindrical electrode to promote the transfer of charged particles between said cylinder and said cylindrical electrode, the inside diameter of said annular electrode being approximately 2.7 times the diameter of said cylindrical electrode.

7. A high voltage electrostatic generator comprising an annular electrode, a hollow dielectric cylinder rotatable about the axis thereof within the annulus defined by said annular electrode, means mounting said cylinder eccentrically with respect to said annular electrode, the inside diameter of said annular electrode being substantially larger than the outside diameter of said cylinder, charge transfer means located inside the path of rotation of said cylinder adjacent the position where said cylinder passes closest to said annular electrode and cooperating with said annular electrode to transfer charged particles between said cylinder and said charge transfer means, a cylindrical electrode coaxial with said annular electrode and located adjacent the path of rotation of said cylinder and substantially opposite from said position, the inside diameter of said annular electrode being approximately 2.7 times the diameter of said cylindrical electrode, and inductor means located in proximity with said cylindrical electrode on the opposing side of the path of rotation of said cylinder and cooperating with said cylindrical electrode to transfer charged particles between said cylinder and said cylindrical electrode.

8. A high voltage electrostatic generator comprising an annular electrode, a hollow dielectric cylinder rotatable about the axis thereof within the annulus defined by said annular electrode, means mounting said cylinder eccentrically with respect to said annular electrode, the inside diameter of said annular electrode being substantially larger than the outside diameter of said cylinder, first knife edge means located inside the path of rotation of said cylinder adjacent the position where said cylinder passes closest to said annular electrode and cooperating with said annular electrode to transfer charged particles between said cylinder and said first knife edge, a cylindrical electrode coaxial with said annular electrode, the inside diameter of said annular electrode being approximately 2.7 times the diameter of said cylindrical electrode, and second knife edge means electrically connected to said cylindrical electrode and supported adjacent the path of rotation of said cylinder substantially diametrically opposite from said position to transfer charged particles between said cylinder and said second knife edge.

9. A high voltage electrostatic generator comprising an annular electrode, a hollow dielectric cylinder rotatable about the axis thereof within the annulus defined by said annular electrode, means mounting said cylinder eccentrically with respect to said annular electrode, the inside diameter of said annular electrode being substantially larger than the outside diameter of said cylinder, first knife edge means located inside the path of rotation of said cylinder adjacent the position where said cylinder passes closest to said annular electrode and cooperating with said annular electrode to transfer charged particles between said cylinder and said first knife edge, a cylindrical electrode coaxial with said annular electrode, the inside diameter of said annular electrode being approximately 2.7 times the diameter of said cylindrical electrode, second knife edge means electrically connected to said cylindrical electrode and supported adjacent the path of rotation of said cylinder substantially diametrically opposite from said position, and inductor means located in proximity with said second knife edge on the opposing side of the path of rotation of said cylinder and cooperating with said second knife edge to transfer charged particles between said cylinder and said second knife edge.

10. A high voltage electrostatic generator comprising a chamber, an annular electrode supported in said chamber, a hollow dielectric cylinder rotatable about the axis thereof within the annulus defined by said annular electrode, means mounting said cylinder eccentrically with respect to said annular electrode, the inside diameter of said annular electrode being substantially larger than the outside diameter of said cylinder, first knife edge means located inside the path of rotation of said cylinder adjacent the position where said cylinder passes closest to said annular electrode and cooperating with said annular electrode to transfer charged particles between said cylinder and said first knife edge, a cylindrical electrode coaxial with said annular electrode, the inside diameter of said annular electrode being approximately 2.7 times the diameter of said cylindrical electrode, second knife edge means electrically connected to said cylindrical electrode and supported adjacent the path of rotation of said cylinder substantially diametrically opposite from said position, inductor means located in proximity with said second knife edge on the opposing side of the path of rotation of said cylinder and cooperating with said second knife edge to transfer charged particles between said cylinder and said second knife edge, and an electrically insulating fluid filling said chamber.

11. A high voltage electrostatic generator comprising a chamber, an annular electrode supported in said chamber, means connecting said annular electrode to a source of ground potential, a hollow dielectric cylinder rotatable about the axis thereof within the annulus defined by said annular electrode, means mounting said cylinder eccentrically with respect to said annular electrode, the inside diameter of said annular electrode being substantially larger than the outside diameter of said cylinder, an excitation electrode located inside the path of rotation of said cylinder adjacent the position where said cylinder passes closest to said annular electrode, a source of potential connected to supply excitation voltage to said excitation electrode to cause said excitation electrode to apply charged particles to said cylinder, a cylindrical high voltage electrode coaxial with said annular electrode, the inside diameter of said annular electrode being approximately 2.7 times the diameter of said high voltage electrode, charge removing means electrically connected to said high voltage electrode and supported inside the path of rotation of said cylinder substantially diametrically opposite from said position, inductor means located in proximity with charge removing means outside the path of rotation of said cylinder and cooperating with said charge removing means to cause charged particles to pass from said cylinder to said charge removing means, a high voltage load connected to receive high voltage from said high voltage electrode, and an electrically insulating fluid filling said chamber.

12. A high voltage electrostatic generator comprising an annular excitation inductor, a thin-walled cylindrical rotor composed of rigid insulating material, means mounting said rotor eccentrically within said annular inductor for relative rotation, a high voltage electrode of generally cylindrical configuration centered within said annular inductor and sized to promote a uniform electric field in the vicinity of said rotor, first charge transfer means located within said rotor adjacent the position where said rotor passes closest to said inductor and cooperating with said inductor to transfer charged particles to said rotor, and second charge transfer means located adjacent said rotor substantially diametrically opposite from said position for transferring charged particles from said rotor to said high voltage electrode.

13. In neutron generating apparatus including a target electrode, the combination comprising a cylindrical housing, an annular excitation inductor mounted concentrically within said housing, a thin-walled cylindrical rotor composed of rigid insulating material, means secured to one end of said rotor supporting the same in said housing eccentrically within said annular inductor for relative rotation, a high voltage electrode of generally cylindrical configuration, means connected with said target and secured to the end of said high voltage electrode opposite from the supported end of said rotor for supporting said high voltage electrode eccentrically within said rotor and centrally within said annular inductor, said high voltage electrode being sized to promote a uniform electric field in the vicinity of said rotor, first knife edge means located within said rotor adjacent the position where said rotor passes closest to said annular inductor and cooperating with said inductor to transfer charged particles to said rotor, and second knife edge means supported by said high voltage electrode within said rotor substantially diametrically opposite from said position for transferring charged particles from said rotor to said high voltage electrode.

References Cited by the Examiner

UNITED STATES PATENTS

| | | | |
|---|---|---|---|
| 2,831,988 | 4/58 | Morel | 310—6 |
| 2,836,785 | 5/58 | Neubert | 310—6 |

FOREIGN PATENTS

| | | |
|---|---|---|
| 766,054 | 3/55 | Great Britain. |
| 571,213 | 2/59 | Canada. |

MILTON O. HIRSHFIELD, *Primary Examiner.*